Dec. 28, 1943.   J. P. SEAHOLM   2,337,777
SWEEP
Filed Jan. 14, 1942

Inventor
JOHN P. SEAHOLM

By Carlsen & Hazle
Attorneys

Patented Dec. 28, 1943

2,337,777

UNITED STATES PATENT OFFICE 2,337,777

SWEEP

John P. Seaholm, Moline, Ill., assignor to Minneapolis-Moline Power Implement Company, Minneapolis, Minn., a corporation of Delaware Application January 14, 1942, Serial No. 426,687

3 Claims. (Cl. 97—205)

This invention relates to improvements in sweeps or agricultural tools of the type used in the cultivation of the soil around growing plants and for summer fallow working of the fields.

Sweeps of this type comprise forwardly converging blades connected to, and joined by, a point and supported on a beam or tool shank in such manner that the blades are caused to travel along beneath the surface of the ground to cut the weeds, vines and such growths while giving the soil a desirable surface cultivation. The blades and points of such tools are, of course, subject to steady and quite rapid wear in such operation and it is in connection with the necessary replacement and reconditioning of the wearing parts and surfaces that my invention is concerned.

In such tools, furthermore, the cutting edges of the blades are subject to a peculiar wearing effect which causes the edges, after a short period of use, to be blunted and to assume an upwardly and forwardly angled condition giving them a tendency to run out of the ground or rise from their normal operating level. This is what may be termed a "sled runner" action and is of great disadvantage since the upward pressure exerted against the working edge must be compensated for by a corresponding increase in downward pressure. Even penetration of the tool is very difficult to maintain when the blades are thus worn, and it has hitherto been necessary to resharpen them and during such time the implement of course may not be used resulting in a loss of time and extra expense to the farmer.

Having in mind the foregoing facts it is the primary object of my invention to provide a sweep in which the wearing parts may be readily replaced when worn but, more important, one in which the blades, when worn to a shape giving them a tendency to run out of the ground, may be reversed in such manner as to instantly restore them to a workable condition without resharpening. Such reversing of the blades may be carried out repeatedly until the blades are discarded and in each case the same edge is used, the invention thus differing and having material advantages over such sweeps as have double edged blades which, of course may only be reversed once before replacement.

Another and related object of my invention is to provide a sweep of this nature having blades in which the working edges are evenly tapered or beveled from each side to facilitate their reversal and present a properly angled working edge each time the blades are reversed. A connected object is to provide blades having mounting means equally effective under all conditions as the blades are reversed.

Still further objects of the invention reside in the provision of novel mounting means for the nose piece or point of the sweep and a novel, simple and durable frog construction or supporting means for the sweep as a whole.

These and other more detailed and specific objects will be disclosed in the course of the following specification, reference being had to the accompanying drawing, in which—

Figure 1:
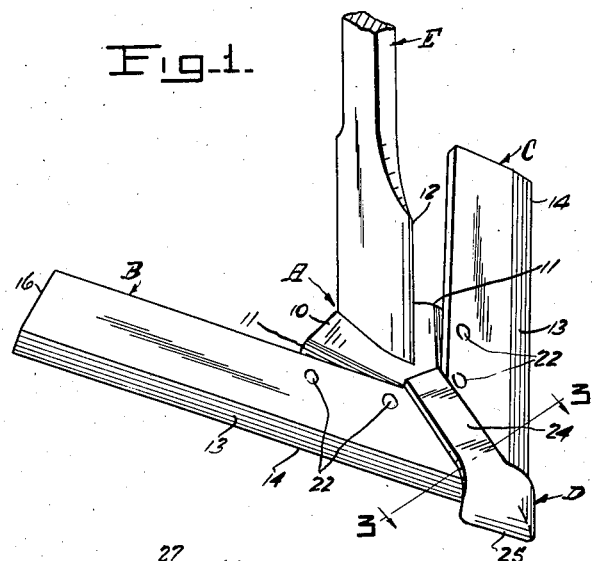
Fig. 1 is a perspective view of a sweep made in accordance with my invention, only a lower part of the mounting beam or tool shank being shown.

Referring now more particularly and by reference characters to the drawing, A represents generally the mounting member or supporting structure, B and C the blades and D the nose piece or point, these being the main parts of the sweep structure. The mounting structure A, taking the place of the usual demountable frog is formed at the bottom of the tool beam or shank E, which is a part of the implement or cultivator, by welding or otherwise securing thereto a plate 10 having laterally and downwardly extending and forwardly converging flanges or portions 11. This plate is secured to the end of the beam and upwardly of the plate the beam is forged to form an upright, forwardly tapered or sharpened cutting or entering edge 12 which will facilitate the travel of the beam in and through the ground as will be apparent.

The blades B and C are identical in shape and construction, each being formed of flat stock, of elongated form, having one longer edge evenly tapered off on each side or double beveled as indicated at 13. A sharp cutting edge 14 is thus formed along one edge of each blade. At their forward ends the blades are cut off angularly as represented at 15 while at rear ends they are cut off square, or substantially so, as designated at 16. The forward ends 15 are also provided with notches 17 for a purpose which will presently appear.

Figure 6:
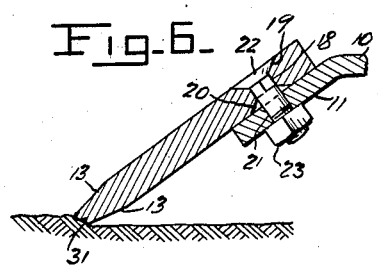
Fig. 6 is an enlarged cross section through one blade and a fragment of the adjacent mounting surface of the frog showing the blade in its worn condition and illustrating the tendency to run out of the ground caused by such wear.
Figure 7:
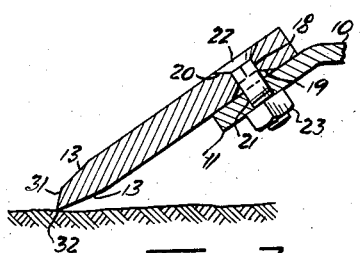
Fig. 7 is a similar view but showing how a workable cutting edge is restored by reversing the blade.
Figures 2, 4:
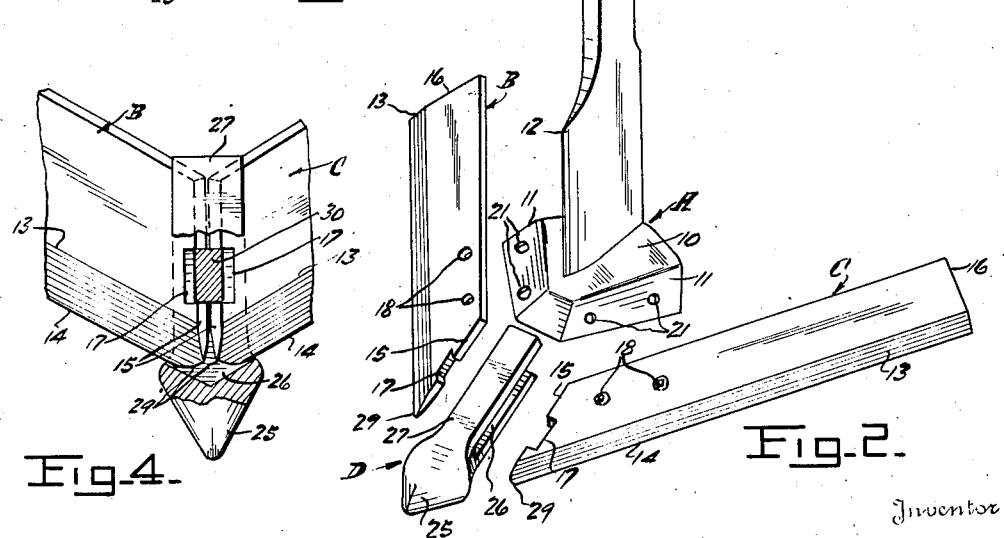
Fig. 2 is a perspective view showing the parts disassembled but in their proper relative positions.
Fig. 4 is an enlarged plan view, partially broken away and shown in horizontal section of the forward portion of the sweep.
Figure 5:
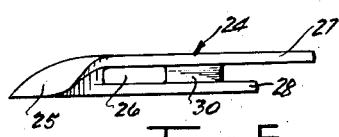
Fig. 5 is an enlarged side elevation of the nose piece, or point, alone.

Near their forward ends the blades B and C have two, or more, evenly spaced mounting openings 18 which are countersunk at each side of the blades as designated at 19—20 and as best shown in Figs. 2, 6 and 7. The flanges 11 are provided with mating openings 21 and when the blades are disposed with forward and upper portions resting on the flanges flat headed plow bolts 22 may be placed through the registering openings 18 and 21. Nuts 23 are then turned up on lower ends of the bolts against lower surfaces of the flanges to securely yet removably mount the blades.

When thus mounted the blades B and C converge forwardly with their angularly cut forward ends 15 meeting along a line extending straight forward of the beam E, or parallel to the direction of travel, and with the cutting edges 14 turned outwardly and downwardly as clearly shown. It will be noted that the blades extend well to the rear beyond the plate 10 and the blades are accordingly formed of relatively thick and heavy material in order to be self supporting at rear ends. Also the use of comparatively heavy material makes it possible to have the beveled surfaces 13 fairly sharply angled but also of some considerable width as evident in the drawing.

Figure 3:
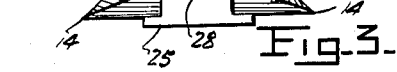
Fig. 3 is an enlarged cross section along the line 3—3 in Fig. 1.

The nose piece or point D is of narrow elongated shape and comprises a stem or tang portion 24 and a forwardly disposed and tapering, widened nose 25. The portion 24 is substantially thicker than the blades B and C and is slotted out rearwardly and laterally to provide an opening 26 defined by upper and lower finger-like parts 27—28. The shape and size of the opening 26 is such that it will nicely receive the forward end or marginal portions of the blades B and C as shown in Figs. 3 and 4, the nose piece being of course thus arranged when the blades are loose or in the course of their mounting on the plate 10 as above described. The upper part 27 of the nose piece then will overlie the forward portions of the blades and the corners or sharply angled ends 29 of the blades will be protected from entanglement with vines or the like.

Formed between the parts 27—28 of the nose piece is a lug or stop member 30 which is so positioned that the notches 17 in forward ends of the blades will embrace its opposite sides as seen in Fig. 4. By such engagement the nose piece will obviously be held against forward or rearward movement between the blades and thus it will be seen that the blades themselves form the sole supporting means for the nose piece. Obviously when either the point or blades are worn away too badly for further use they may be readily removed and replaced by manipulating the four plow bolts 22.

It is obvious that the sweep thus constructed may be used in usual fashion, the blades being caused to travel along or beneath the surface of the ground to give the desired cultivating and weed cutting action of such implements.

Referring now particularly to Fig. 6 it is seen that the sharpened cutting edge of each blade B and C is presented at a forwardly (and of course outwardly) sloping angle to the ground and a blade thus positioned wears at its edge to an upwardly and forwardly angled shape as designated at 31. This blunted edge thus is caused to act somewhat as a "sled runner" and the pressure of the earth as the tool moves forwardly is exerted upwardly and rearwardly making it difficult to maintain proper penetration. This effect is well known and makes it necessary in the usual case to frequently resharpen or completely replace the blades.

In accordance with my invention, however, when the blades as originally mounted are thus worn and difficulty in proper cutting and penetration begins to be manifest, I simply remove the bolts 22 and reverse the blades. That is, the blade on one side of the sweep is placed on the other side and to then properly locate it upon the flanges it must be turned over or inverted as will be apparent. The bolts 22 are then replaced and the previously blunted edge 31 assumes an upwardly and slightly rearwardly angled position as seen in Fig. 7 causing it to penetrate readily and providing a workable cutting edge as seen at 32. When the blades again wear to the shape of Fig. 6 they may again be transposed and inverted and this operation may be carried out several times until the blades are finally discarded. In such reversing operations the double bevel or even taper of the edge portions 13 is important since the same relative slope is presented next to the actual cutting edges no matter which sides of the blades are up.

The countersinking of the bolt openings 18 at each side 19—20 is also of importance in that the flat heads of the bolts 22 may lie flush with either side of the blades when they are reversed and inverted.

It will be noted that the lower finger-like part 28 of the nose piece D is shortened, relative to the upper one 27, in order to clear the forward end of the plate 10; and said upper part 27 may extend back over the converging rear and upper edges of the blades as shown in Fig. 1.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A sweep of the character described, comprising a mounting member, a pair of blades removably secured to said mounting member in forwardly converging relation, the forward ends of the blades being brought together into meeting engagement, a nose piece disposed longitudinally at the junction of the forward ends of the blades and having an opening to receive said ends, said blades having notches in their forward ends, and a stop member on the nose piece formed integrally therewith and located in the opening therein, said stop member being adapted to be received by the notches whereby said blades will secure the nose piece against displacement.

2. A sweep of the character described, comprising a mounting member, a pair of blades removably secured to said mounting member in forwardly converging relation, the forward ends of the blades being disposed adjacent each other, a nose piece disposed longitudinally at the junction of the forward ends of the blades and having an opening extending from side to side to receive said ends and which opening divides the nose piece at rear ends into upper and lower finger portions adapted to engage respectively the upper and lower forward end portions of the blades, the said blades having notches in their forward ends, and a lug member joining the said finger portions of the nose piece and adapted to be received in the notches in the blades to secure the nose piece against forward or rearward displacement relative to the blades.

3. A sweep of the character described, comprising a mounting member, a pair of blades removably secured to said mounting member in forwardly converging relation, a nose piece disposed longitudinally at the junction of the forward ends of the blades and having an opening extending from side to side to receive said ends and which opening divides the nose piece at rear ends into upper and lower finger portions adapted to engage respectively the upper and lower forward end portions of the blades, a lug member joining the said finger portions of the nose piece and being narrower than said portions, and said blades having notches in their forward ends adapted to engage opposite sides of said lug member to lock the nose piece against displacement.

JOHN P. SEAHOLM.